(12) United States Patent
Otani et al.

(10) Patent No.: US 12,195,948 B2
(45) Date of Patent: Jan. 14, 2025

(54) OPERATION SUPPORT SERVER, OPERATION SUPPORT SYSTEM, AND OPERATION SUPPORT METHOD

(71) Applicant: KOBELCO CONSTRUCTION MACHINERY CO., LTD., Hiroshima (JP)

(72) Inventors: Masaki Otani, Hiroshima (JP); Seiji Saiki, Hiroshima (JP); Yoichiro Yamazaki, Hiroshima (JP)

(73) Assignee: Kobelco Construction Machinery Co., Ltd, Hiroshima (JP)

( * ) Notice: Subject to any disclaimer, the term of this patent is extended or adjusted under 35 U.S.C. 154(b) by 291 days.

(21) Appl. No.: 17/790,745

(22) PCT Filed: Jan. 12, 2021

(86) PCT No.: PCT/JP2021/000633
§ 371 (c)(1),
(2) Date: Jul. 4, 2022

(87) PCT Pub. No.: WO2021/166487
PCT Pub. Date: Aug. 26, 2021

(65) Prior Publication Data
US 2023/0046933 A1    Feb. 16, 2023

(30) Foreign Application Priority Data
Feb. 18, 2020  (JP) ................................. 2020-025624

(51) Int. Cl.
*E02F 3/43*     (2006.01)
*E02F 9/20*     (2006.01)
(Continued)

(52) U.S. Cl.
CPC .............. *E02F 9/205* (2013.01); *E02F 3/435* (2013.01); *E02F 9/26* (2013.01); *H04Q 9/00* (2013.01)

(58) Field of Classification Search
CPC ............. E02F 9/205; E02F 3/435; E02F 9/26; E02F 9/267; E02F 9/226; H04Q 9/00
(Continued)

(56) References Cited

U.S. PATENT DOCUMENTS

2006/0048735 A1* 3/2006 Umezu ................. E02F 9/2246
                                                            701/112
2015/0308469 A1* 10/2015 Beschorner ............ F15B 19/00
                                                              60/327
(Continued)

FOREIGN PATENT DOCUMENTS

CN   108878997 A   11/2018
CN   110155023 A   8/2019
(Continued)

OTHER PUBLICATIONS

The extended European Search Report dated Apr. 18, 2023 issued in the corresponding EP Patent Application No. 21756181.0.
(Continued)

*Primary Examiner* — Ian Jen
*Assistant Examiner* — Hossam M Abd el Latif
(74) *Attorney, Agent, or Firm* — Carrier, Shende & Associates P.C.; Joseph P. Carrier; Fulchand P. Shende

(57) ABSTRACT

There is provided a technique capable of appropriately controlling a warm-up completion timing of a work machine in view of scheduled use of the work machine. A warm-up period elapsed until a measurement value of an internal state variable satisfies a designated condition, i.e., warm-up is completed since a warm-up operation of a work machine 40 was started is predicted based on a measurement value of an
(Continued)

external state variable with an operation of the work machine 40 stopped. The warm-up operation of the work machine 40 is started at a first designated time t1 as an appropriate timing based on the predicted warm-up period such that the measurement value of the internal state variable of the work machine 40 satisfies the designated condition by a second designated time t2.

7 Claims, 9 Drawing Sheets

(51) Int. Cl.
*E02F 9/22* (2006.01)
*E02F 9/26* (2006.01)
*H04Q 9/00* (2006.01)

(58) Field of Classification Search
USPC .......................................................... 701/50
See application file for complete search history.

(56) References Cited

U.S. PATENT DOCUMENTS

| 2017/0212503 A1* | 7/2017 | Hiramatsu | G05B 19/418 |
| 2018/0292805 A1* | 10/2018 | Endou | G05B 19/404 |
| 2018/0345816 A1 | 12/2018 | Sakakibara | |
| 2019/0114847 A1 | 4/2019 | Wagner et al. | |
| 2019/0124792 A1* | 4/2019 | Rosenthal | H05K 7/20336 |
| 2019/0248359 A1 | 8/2019 | Miller et al. | |
| 2020/0408164 A1* | 12/2020 | Ohori | F02D 41/061 |
| 2021/0215112 A1* | 7/2021 | Ohori | F02D 41/068 |
| 2022/0364763 A1* | 11/2022 | Shimauchi | B60H 1/321 |

FOREIGN PATENT DOCUMENTS

| EP | 3 396 075 A1 | 2/2010 |
| EP | 3 150 768 A1 | 4/2017 |
| JP | H07-008566 U | 2/1995 |
| JP | 2004-138298 A | 5/2004 |
| JP | 2006-083800 A | 3/2006 |
| JP | 2013-147881 A | 8/2013 |
| JP | 2018-048472 A | 3/2018 |
| JP | 2019-202352 A | 11/2019 |
| WO | 2014/110524 A1 | 7/2014 |
| WO | 2019/053833 A1 | 3/2019 |

OTHER PUBLICATIONS

Office Action dated Apr. 24, 2024 issued in the corresponding Chinese Patent Application No. 202180013614.1 with the English machine translation thereof.

\* cited by examiner

OPERATION SUPPORT SERVER, OPERATION SUPPORT SYSTEM, AND OPERATION SUPPORT METHOD

TECHNICAL FIELD

The present invention relates to a technique for a warm-up operation of a work machine.

BACKGROUND ART

A technique for performing a warm-up operation depending on a temperature of a hydraulic system of a work machine or a construction machine has been proposed (see, e.g., Patent Literatures 1 to 2).

CITATION LIST

Patent Literature

Patent Literature 1: Domestic re-publication of PCT international application No. 2019/053833
Patent Literature 2: Japanese Patent Laid-Open No. 2018-048472

SUMMARY OF INVENTION

Technical Problem

However, when an operator remotely operates a work machine, the operator does not easily recognize a status of the work machine. For example, if the work machine is positioned at a location where an air temperature is low, a warm-up operation needs to be performed before work by the work machine is started. However, the operator does not notice the necessity of the warm-up operation because he/she is at a location spaced apart from the work machine. The operator cannot immediately begin the work even in an attempt to start the work by the work machine.

The present invention is directed to providing a technique capable of starting a warm-up operation of a work machine in view of scheduled use of the work machine and an external state variable of the work machine.

Solution to Problem

An operation support server according to the present invention comprises
  a first support processing element configured to recognize a time series of predicted values of an external state variable representing an environment of a work machine over a period from a current time to a designated time as a scheduled work start time by the work machine based on communication with an external information source, and
  a second support processing element configured to recognize a predicted value at the designated time of an internal state variable representing a state of a component in the work machine to be affected by a warm-up operation mode of the work machine based on the time series of the predicted values of the external state variable recognized by the first support processing element and perform processing for causing the work machine to start a warm-up operation at a time before the designated time based on communication with the work machine such that the predicted value of the internal state variable at the designated time satisfies a designated condition.

According to the operation support server having the configuration, the predicted value of the internal state variable representing the state of the component in the work machine at the designated time is estimated based on the time series of the predicted values of the external state variable over the period until the designated time. The "external state variable" is a variable that affects the internal state variable of the work machine and represents an environment of the work machine. The "internal state variable" is a variable that changes in value depending on the warm-up operation of the work machine and represents a state of a designated component among components in the work machine. The "designated time" is a concept containing a time designated by a user such as an operator of the work machine or a director who supervises an operation state of the work machine or any time included in a period to be designated by the user.

The warm-up operation of the work machine is started at a time before the designated time based on communication with the work machine such that the predicted value of the internal state variable of the work machine at the designated time satisfies the designated condition. Accordingly, the operator can start work at the designated time using the work machine the internal state variable of which satisfies the designated condition.

DESCRIPTION OF EMBODIMENT (Configuration of Operation Support System)

Figure 1:
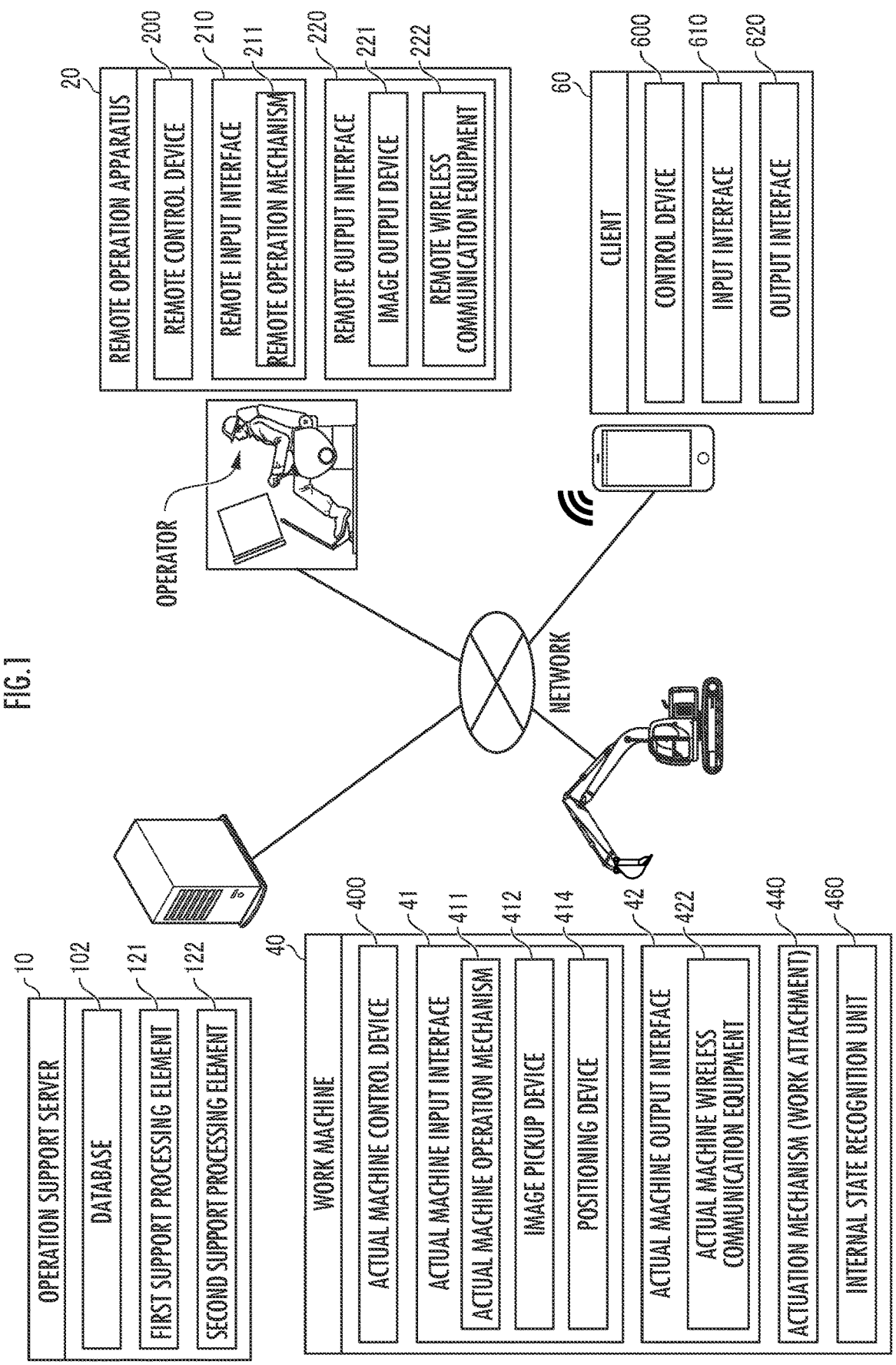
FIG. 1 is an explanatory diagram relating to a configuration of an operation support system according to an embodiment of the present invention.

An operation support system as an embodiment of the present invention illustrated in FIG. 1 comprises an operation support server 10 and a work machine 40 to be remotely operated by a remote operation apparatus 20 (a client). The operation support server 10, the remote operation apparatus 20, the work machine 40, and a client 60 are configured to be network-communicable with one another. An intercommunication network between the operation support server 10 and the remote operation apparatus 20 and an intercommunication network between the operation support server 10 and the work machine 40 may be the same as or different from each other.

(Configuration of Operation Support Server)

The operation support server 10 comprises a database 102, a first support processing element 121, and a second support processing element 122. The database 102 stores and holds an operation schedule of the work machine 40. The database 102 may store and hold picked-up image data, for example, in addition to the operation schedule. The database 102 may be constituted by a database server separate from the operation support server 10. Each of the support processing elements is constituted by an arithmetic processing unit (a single core processor or a multi-core processor or a processor core constituting the processor), and reads required data and software from a storage device such as a memory and performs arithmetic processing, described below, conforming to the software with the data used as a target.

(Configuration of Remote Operation Apparatus)

The remote operation apparatus 20 comprises a remote control device 200, a remote input interface 210, and a remote output interface 220. The remote operation apparatus 20 functions as at least one of a "first client" and a "second client". The remote control device 200 is constituted by an arithmetic processing unit (a single core processor or a multi-core processor or a processor core constituting the processor), and reads required data and software from a storage device such as a memory and performs arithmetic processing conforming to the software with the data used as a target. The remote input interface 210 comprises a remote operation mechanism 211. The remote output interface 220 comprises an image output device 221 and remote wireless communication equipment 222.

The remote operation mechanism 211 includes a traveling operation device, a turning operation device, a boom operation device, an arm operation device, and a bucket operation device. Each of the operation devices has an operation lever that receives a rotation operation. The operation lever (traveling lever) of the traveling operation device is operated to move a lower traveling body 410 in the work machine 40. The traveling lever may also serve as a traveling pedal. For example, a traveling pedal fixed to a base portion or a lower end portion of the traveling lever may be provided. An operation lever (turning lever) of the turning operation device is operated to move a turning mechanism 430 in the work machine 40. An operation lever (boom lever) of the boom operation device is operated to move a boom cylinder 442 in the work machine 40. An operation lever (arm lever) of the arm operation device is operated to move an arm cylinder 444 in the work machine 40. An operation lever (bucket lever) of the bucket operation device is operated to move a bucket cylinder 446 in the work machine 40.

Figure 2:
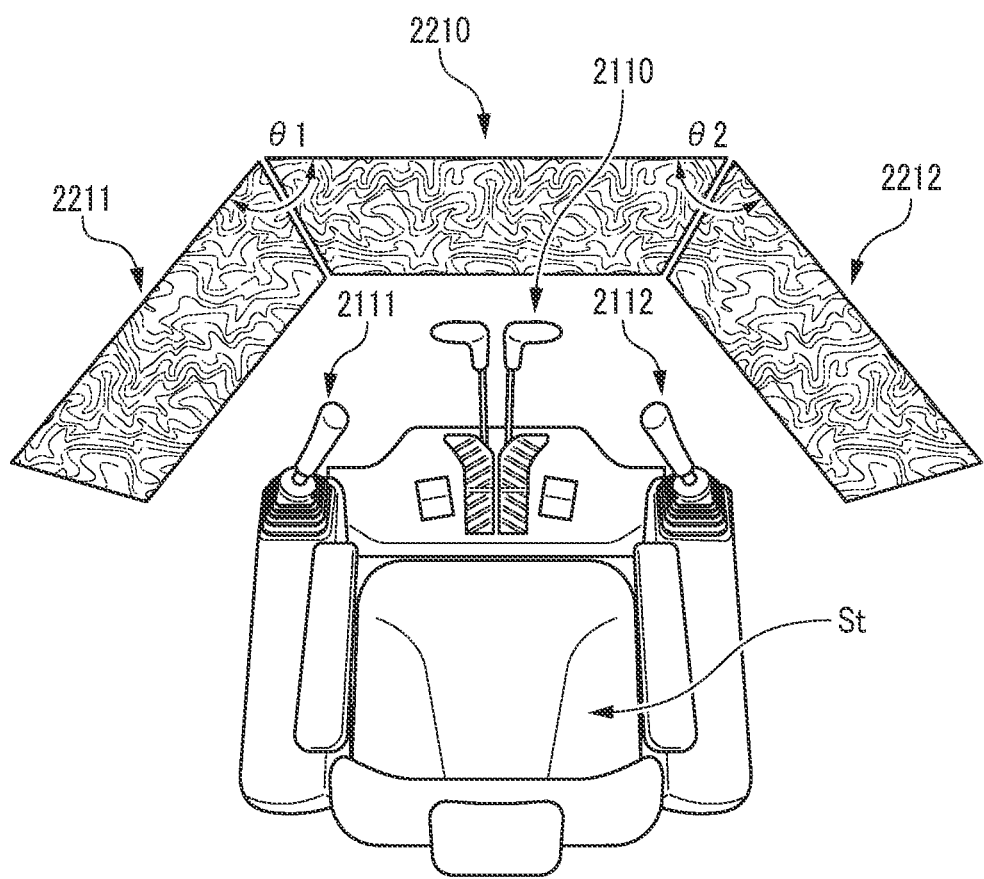
FIG. 2 is an explanatory diagram relating to a configuration of a remote operation apparatus.

Each of the operation levers constituting the remote operation mechanism 211 is arranged around a seat St for an operator to sit, as illustrated in FIG. 2, for example. Although the seat St has a form such as a high back chair with armrests, the seat St may be a seating portion in any form in which the operator can sit, for example, a form like a low back chair with no headrest or a form like a chair with no backrest.

A pair of left and right traveling levers 2110 respectively corresponding to left and right crawlers are laterally arranged side by side in front of the seat St. One operation lever may also serve as a plurality of operation levers. For example, a left-side operation lever 2111 provided in front of a left-side frame of the seat St illustrated in FIG. 2 may function as an arm lever when operated in a front-rear direction and function as a turning lever when operated in a left-right direction. Similarly, a right-side operation lever 2112 provided in front of a right-side frame of the seat St illustrated in FIG. 2 may function as a boom lever when operated in the front-rear direction and function as a bucket lever when operated in the left-right direction. A lever pattern may be arbitrarily changed in response to an operation instruction of the operator.

The image output device 221 comprises a central image output device 2210, a left-side image output device 2211, and a right-side image output device 2212 respectively having substantially rectangular screens arranged in front of, diagonally leftward in front of, and diagonally rightward in front of the seat St, as illustrated in FIG. 2, for example. Respective shapes and sizes of the screens (image display regions) of the central image output device 2210, the left-side image output device 2211, and the right-side image output device 2212 may be the same as or different from one another.

As illustrated in FIG. 2, a right edge of the left-side image output device 2211 is adjacent to a left edge of the central image output device 2210 such that the screen of the central image output device 2210 and the screen of the left-side image output device 2211 form an inclined angle $\theta1$ (e.g., $120° \leq \theta1 \leq 150°$). As illustrated in FIG. 2, a left edge of the right-side image output device 2212 is adjacent to a right edge of the central image output device 2210 such that the screen of the central image output device 2210 and the screen of the right-side image output device 2212 form an inclined angle $\theta2$ (e.g., $120° \leq \theta2 \leq 150°$). The inclined angles $\theta1$ and $\theta2$ may be the same as or different from each other.

The respective screens of the central image output device 2210, the left-side image output device 2211, and the right-side image output device 2212 may be parallel to one another in a vertical direction, or may be inclined in the vertical direction. At least one of the central image output device 2210, the left-side image output device 2211, and the right-side image output device 2212 may be constituted by a plurality of separated image output devices. For example, the central image output device 2210 may be constituted by a pair of image output devices, which are vertically adjacent to each other, each having a substantially rectangular screen. Each of the image output devices 2210 to 2212 may further comprise a speaker (voice output device).

(Configuration of Work Machine)

As illustrated in FIG. 1, the work machine 40 comprises an actual machine control device 400, an actual machine input interface 41, an actual machine output interface 42, and an actuation mechanism 440. The actual machine control device 400 is constituted by an arithmetic processing unit (a single core processor or a multi-core processor or a processor core constituting the processor), and reads required data and software from a storage device such as a memory and performs arithmetic processing conforming to the software with the data used as a target.

Figure 3:
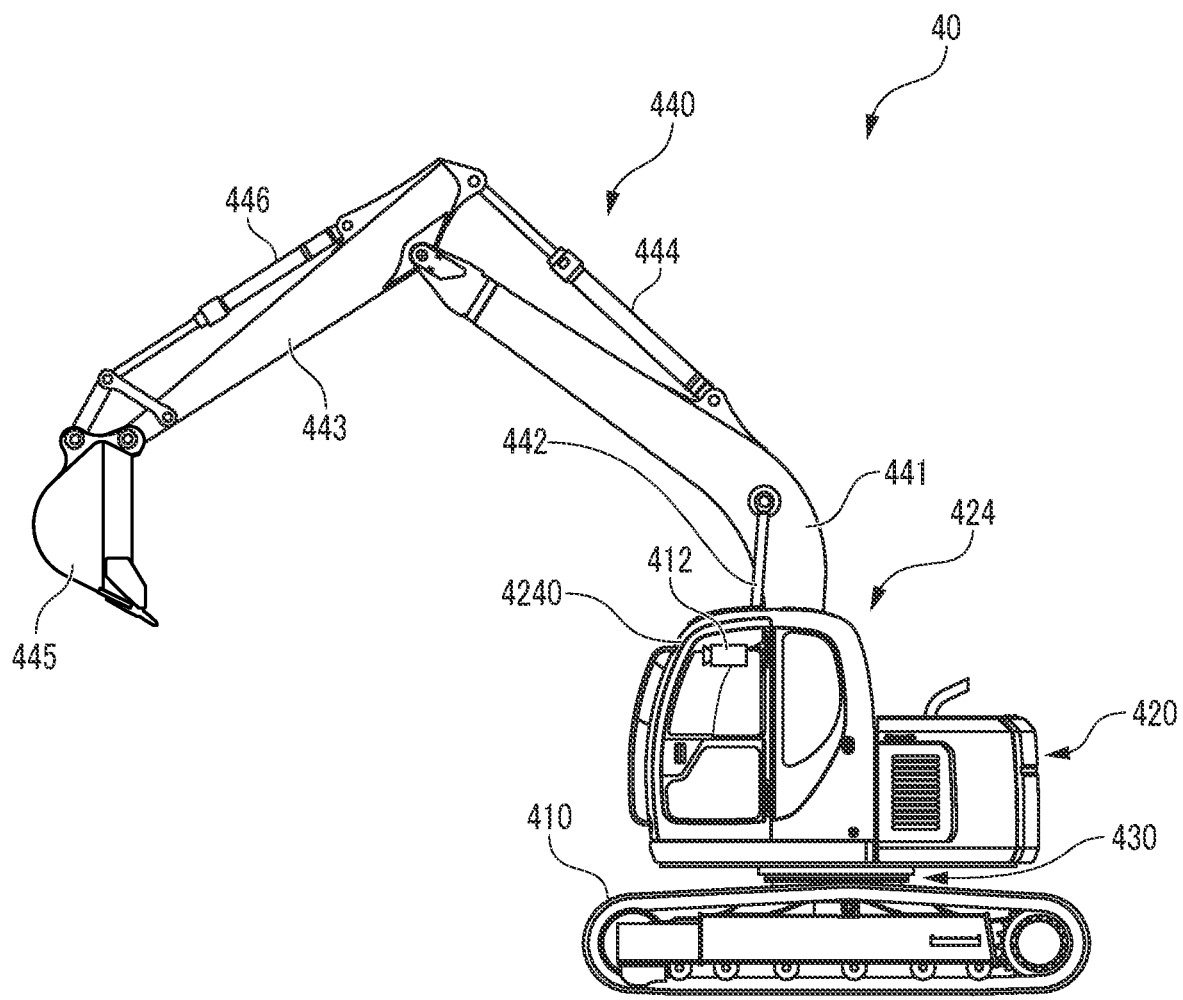
FIG. 3 is an explanatory diagram relating to a configuration of a work machine.

The work machine 40 is a crawler shovel (construction machine), for example, and comprises a crawler type lower traveling body 410 and an upper turning body 420 turnably loaded on the lower traveling body 410 via the turning mechanism 430 as shown in FIG. 3. A front left side portion of the upper turning body 420 is provided with a cab 424 (an operation room). A front central portion of the upper turning body 420 is provided with the work attachment 440.

The actual machine input interface 41 comprises an actual machine operation mechanism 411, an actual machine image pickup device 412, and a positioning device 414. The actual machine operation mechanism 411 comprises a plurality of actual machine operation levers arranged similarly to the remote operation mechanism 211 around a seat arranged in the cab 424. The cab 424 is provided with a driving mechanism or a robot that receives a signal corresponding to an operation mode of the remote operation mechanism 211 and moves the actual machine operation levers based on the received signal. The actual machine image pickup device 412 is installed in the cab 424, for example, and picks up images of environments including at least a part of the actuation mechanism 440 through a front window and a pair of left and right side windows. Some or all of the front window and the side windows may be omitted. The positioning device 414 is constituted by a GNSS receiver (GNSS: Global Navigation Satellite System) configured to detect an existence position of the work machine 40.

The actual machine output interface 42 comprises actual machine wireless communication equipment 422 configured to network-communicate with the operation support server 10, the remote operation apparatus 20, and the client 60.

The work attachment 440 as the actuation mechanism comprises a boom 441 mounted on the upper turning body 420 to be raisable and lowerable, an arm 443 rotatably connected to a distal end of the boom 441, and a bucket 445 rotatably connected to a distal end of the arm 443. The boom cylinder 442, the arm cylinder 444, and the bucket cylinder 446 each constituted by a stretchable hydraulic cylinder are mounted on the work attachment 440.

The boom cylinder 442 is interposed between the boom 441 and the upper turning body 420 by expanding and contracting upon being supplied with hydraulic oil to rotate the boom 441 in a rise and fall direction. The arm cylinder 444 is interposed between the arm 443 and the boom 441 by expanding and contracting upon being supplied with hydraulic oil to rotate the arm 443 around a horizontal axis relative to the boom 441. The bucket cylinder 446 is interposed between the bucket 445 and the arm 443 by expanding and contracting upon being supplied with hydraulic oil to rotate the bucket 445 around a horizontal axis relative to the arm 443.

The work machine 40 comprises an internal state recognition unit 460. The internal state recognition unit 460 includes, for example, a temperature sensor arranged in piping of engine cooling water for the work machine 40, a temperature sensor arranged in hydraulic piping, a tank, or the like in a hydraulic system configured to operate the turning mechanism 430 and the work attachment 440, and a temperature sensor arranged in another component in the work machine 40.

(Configuration of Client)

The client 60 is a terminal device such as a smartphone, a tablet terminal, or a personal computer, and comprises a control device 600, an input interface 610, and an output interface 620. The client 60 functions as at least one of the "first client" and the "second client". The control device 600 is constituted by an arithmetic processing unit (a single core processor or a multi-core processor or a processor core constituting the processor), and reads required data and software from a storage device such as a memory and performs arithmetic processing conforming to the software with the data used as a target.

The input interface 610 is constituted by a button and a switch of a touch panel type, for example. The output interface 620 comprises an image output device and wireless communication equipment.

(First Function)

Figure 4:
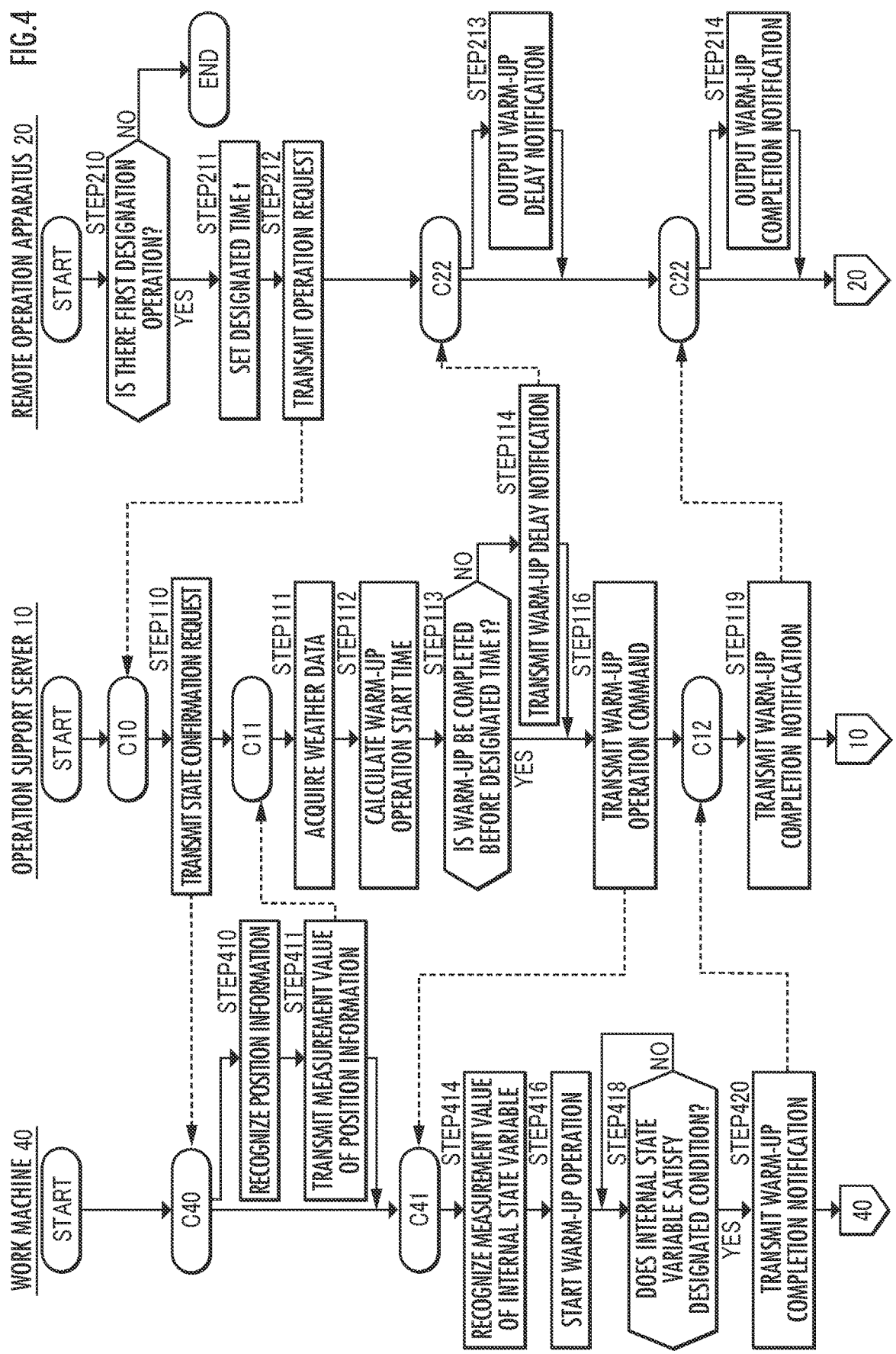
FIG. 4 is an explanatory diagram relating to a function of the operation support system.

In the remote operation apparatus 20 (or the client 60), the presence or absence of a first designation operation through the remote input interface 210 by the operator is determined (FIG. 4/STEP210). The "first designation operation" is an operation for selecting the work machine 40 that cooperates with the remote operation apparatus 20. The presence or absence of the first designation operation is determined in the following manner, for example. A map and/or a list representing respective existence positions of work machines 40 that can cooperate with the remote operation apparatus 20, for example, are/is outputted to the remote output interface 220. Then, it is determined whether an operation such as a tap, a swipe, or a pinching in the remote input interface 210 configured to designate the one work machine 40 that cooperates with the remote operation apparatus 20 has been performed by the operator.

If a result of the determination is negative (FIG. 4/NO in STEP210), processing subsequent to the determination of the presence or absence of the first designation operation is repeated. On the other hand, if the result of the determination is affirmative (FIG. 4/YES in STEP210), a designated time t of the work machine 40 that cooperates with the remote operation apparatus 20 is set by the operator (FIG. 4/STEP211). The designated time t is a scheduled time when the remote operation apparatus 20 starts work by the work machine 40. The set designated time t is stored and held in the database 102.

Then, an operation request is transmitted to the operation support server 10 through the remote wireless communication equipment 222 (FIG. 4/STEP212). The request includes a work machine identifier for identifying the work machine 40 which has established communication with the remote operation apparatus 20 or the work machine 40 designated through the remote input interface 210, and the set designated time t.

In the operation support server 10, if the operation request is received (FIG. 4/C10), the first support processing element 121 transmits a state confirmation request to the work machine 40 to be identified by the work machine identifier (FIG. 4/STEP110).

In the work machine 40, if the state confirmation request is received through the actual machine wireless communication equipment 422 (FIG. 4/C40), the actual machine control device 400 recognizes position information (a latitude and a longitude) of the work machine 40 through the positioning device 414 (FIG. 4/STEP410).

The actual machine control device 400 transmits the position information or position data representing the position information to the remote operation apparatus 20 through the actual machine wireless communication equipment 422 (FIG. 4/STEP411).

In the operation support server 10, the first support processing element 121 recognizes the position information (FIG. 4/C11).

If the position information of the work machine 40 can be previously recognized (position information at the time of previous operation of the work machine 40 is stored and held in the database 102, for example), the state confirmation request to the work machine 40 by the operation support server 10 (FIG. 4/STEP110) and the recognition of the position information (FIG. 4/C11) may be omitted. In the operation support server 10, if the first support processing element 121 recognizes the position information (FIG. 4/C11), a measurement value of an external state variable is recognized based on the position information (FIG. 4/STEP111). The "external state variable" is a variable that affects an internal state variable of the work machine 40 and represents an environment of the work machine 40. For example, an air temperature around the work machine 40 corresponds to the external state variable. The "internal state variable" is a variable representing a state of a component in the work machine. For example, a temperature of a designated component corresponds to the internal state variable. An example of the "temperature of the designated component" is a water temperature T1 in piping of engine cooling water for the work machine 40, a temperature T2 of hydraulic piping, a tank, or the like in a hydraulic system for operating the turning mechanism 430 and the work attachment 440, and a temperature of another component in the work machine 40, such that measured by the internal state recognition unit 460, and is a temperature of the component in the work machine 40 that changes depending on an outside air temperature of the work machine 40 with an engine as a power source of the work machine 40 not operated.

For example, the first support processing element 121 refers, based on position information of the work machine 40, weather information of a position represented by the position information or an area including the position to a weather information database as an external information source, to recognize the measurement value of the external state variable (FIG. 4/STEP111). The weather information database is provided by a licensed forecasting service operator, and includes past data and prediction data of weather at any point across the country.

The first support processing element 121 recognizes weather information corresponding to the position of the work machine 40 over several hours (e.g., six hours) before a current time t1 until the designated time t, for example. If the external state variable is an air temperature, a time series of measurement values of the air temperature over several hours until the current time t1 and a time series of predicted values of the air temperature from the current time t1 to the designated time t are recognized.

Then, the second support processing element 122 calculates a warm-up operation start time t2 (FIG. 4/STEP112).

If the external state variable is the air temperature, the second support processing element 122 recognizes a predicted value (predicted temperature) of the temperature of the designated component with the work machine 40 not used.

Figure 6:
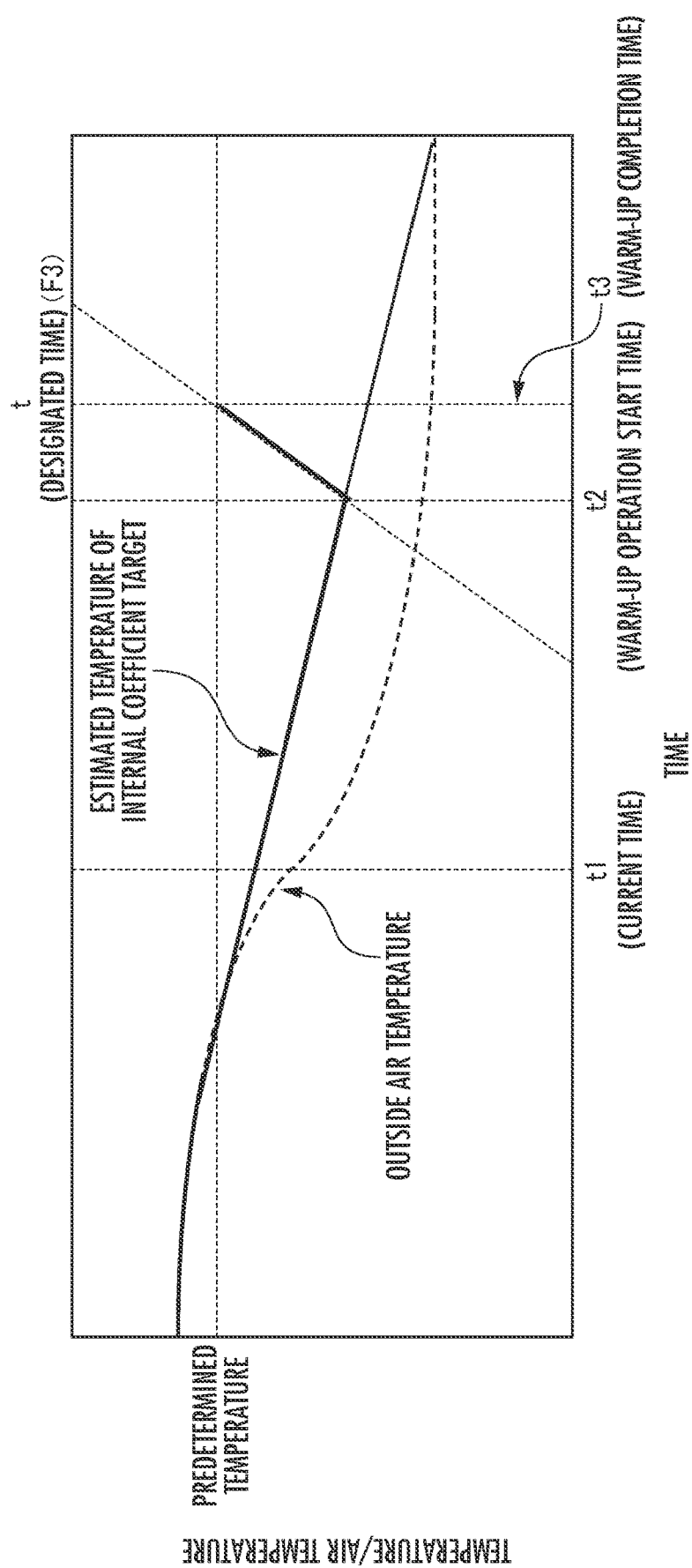
FIG. 6 is a diagram illustrating respective changes of an outside air temperature of the work machine and an estimated temperature of a designated component.

If the work machine 40 has not been used and if an outside air temperature around the work machine 40 is constant, for example, the temperature of the designated component is substantially the same as the outside air temperature. However, if the work machine 40 has not been used and if the outside air temperature varies, for example, the temperature of the designated component varies. As illustrated in FIG. 6, when the outside air temperature decreases, the temperature of the designated component also decreases. However, if the outside air temperature gently decreases (or increases), the outside air temperature and the temperature of the designated component are substantially the same. On the other hand, if the outside air temperature rapidly decreases (or increases), a difference occurs between the outside air temperature and the temperature of the designated component.

The second support processing element 122 calculates, assuming that there occurs a temperature difference between the outside air temperature and the temperature of the designated component as illustrated in FIG. 6 when a rate of change F1 (° C./min) of the temperature per unit time of the designated component has a threshold value and there is a rate of change F2 (° C./min) of the outside air temperature per unit time exceeding the threshold value, the temperature difference. The rate of change F1 corresponds to a heat transfer rate when there is a temperature difference between the designated component and the outside air temperature, and the threshold value of the rate of change F1 can be previously recognized or estimated by past actual results of the work machine 40, simulation, and the like.

The first support processing element 121 recognizes a temperature change of the designated component with the engine of the work machine 40 not operated from the current time t1 to at least the designated time t based on the outside air temperature recognized from the weather information database and the calculated temperature difference.

The second support processing element 122 previously recognizes or estimates a warm-up capability of the work machine 40 by past actual results, simulation, and the like. The warm-up capability of the work machine 40 is recognized as a temperature increase rate F3 (° C./min) per unit time of the designated component, for example.

The second support processing element 122 calculates the warm-up operation start time t2 based on the time series of the predicted values of the temperature of the designated component from the current time t1 to the designated time t, the warm-up capability of the work machine 40, and the designated time t. The calculation considers a function of drawing heat from the designated component by outside air until a warm-up operation is started, and considers that a function of warming the designated component by heat of the engine is overwhelmingly larger than the function of drawing heat from the designated component by outside air when the warm-up operation is started and the engine is operated.

Specifically, the second support processing element 122 recognizes the time series of the predicted values of the temperature of the designated component in a period from the current time t1 to the designated time t as described above. When the designated component having the estimated temperature at each of time points is warm-up operated in the warm-up capability F3 (° C./min) of the machine, a time point where warm-up is completed at the designated time t is specified as the warm-up start time t2. In FIG. 6, a straight line having an inclination of the warm-up capability F3 (° C./min) can be illustrated to pass through a point that reaches a predetermined temperature at a warm-up completion time t3. Although the estimated temperature of the designated component continues to decrease until the warm-up operation start time t2, the estimated temperature continues to increase at F3 (° C./min) after the warm-up operation start time t2 and increases to a predetermined temperature at the warm-up completion time t3.

The second support processing element 122 may specify as the warm-up start time t2 a time point where warm-up is completed immediately before (set to be one to five minutes before, for example) the designated time tin order to reliably complete the warm-up at the designated time t.

The prediction accuracy of the temperature of the designated component can be enhanced by adding an element (an atmospheric pressure, a wind speed, a humidity, a rainfall, a snowfall, etc.) other than the air temperature as an external state variable.

The second support processing element 122 calculates the warm-up operation start time t2 (FIG. 4/STEP112), and transmits a warm-up delay notification (FIG. 4/STEP114) when the warm-up completion time t3 is later than the designated time t (FIG. 4/NO in STEP113). The remote operation apparatus 20/the client 60 outputs the warm-up delay notification to the output interface 220 when it receives the warm-up delay notification (FIG. 4/C22), and notifies the operator that the warm-up has not been completed at the time point of the designated time t (FIG. 4/STEP213). If a sufficient warm-up time period cannot be ensured between the current time t1 and the designated time t, the processing is performed. At this time, the warm-up completion time t3 to be estimated may be outputted to the remote output interface 220.

The second support processing element 122 transmits a warm-up operation command to the work machine 40 (FIG. 4/STEP116) when the warm-up operation start time t2 is reached. The warm-up operation command includes a command to instruct the work machine 40 to perform warm-up, and may additionally include the designated time t. If the time point where the warm-up is completed is later than the designated time t (FIG. 4/NO in STEP113), the current time t1 is set to the warm-up operation start time t2, and the warm-up operation command is immediately transmitted to the work machine 40.

In the work machine 40, if the warm-up operation command is received (FIG. 4/C41), the actual machine control device 400 recognizes the measurement value of the temperature of the designated component using the internal state recognition unit 460 (FIG. 4/STEP414). The actual machine control device 400 starts the warm-up operation depending on the measurement value of the temperature of the designated component (FIG. 4/STEP416).

Figure 7:
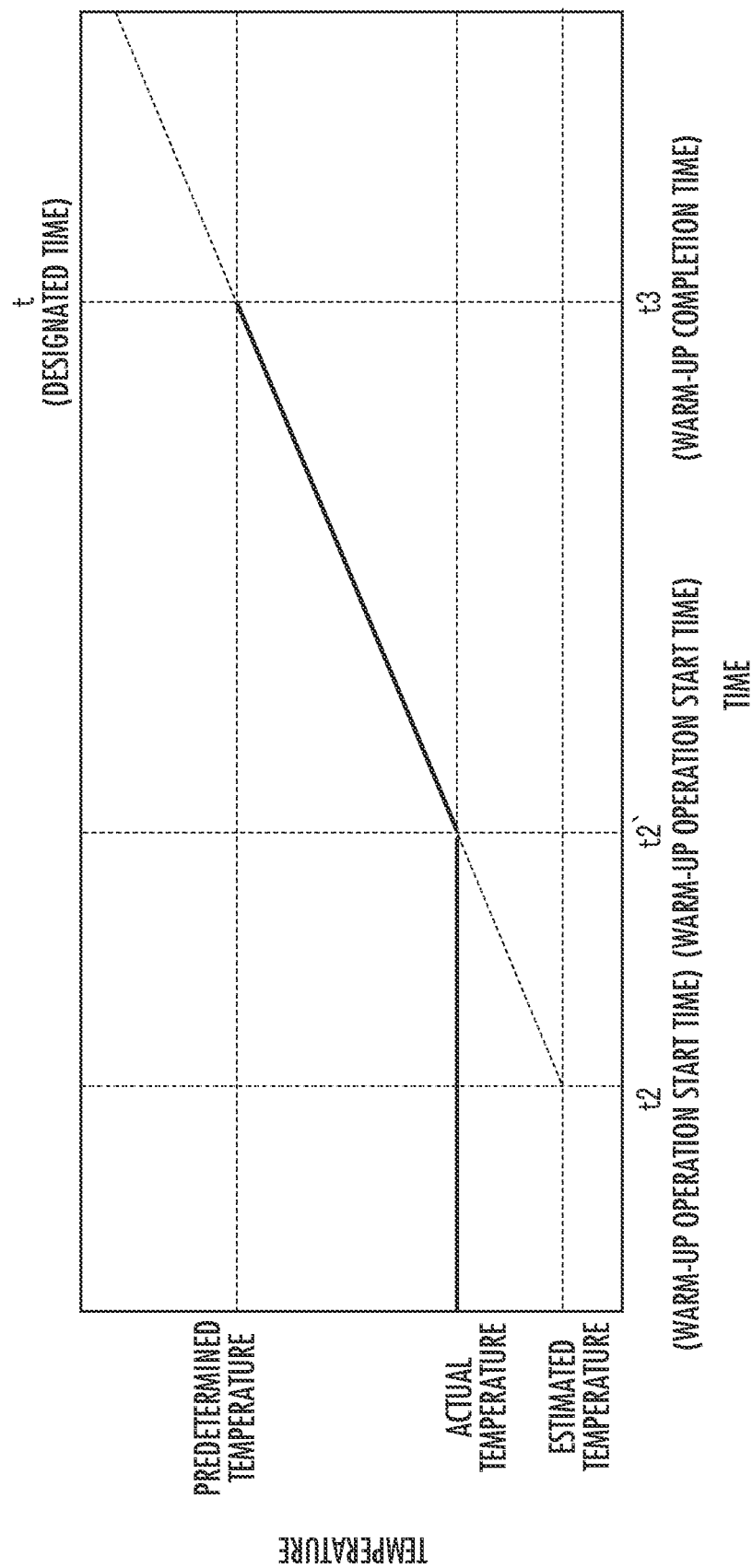
FIG. 7 is a diagram illustrating a change in temperature of the designated component with warm-up of the work machine.
Figure 8:
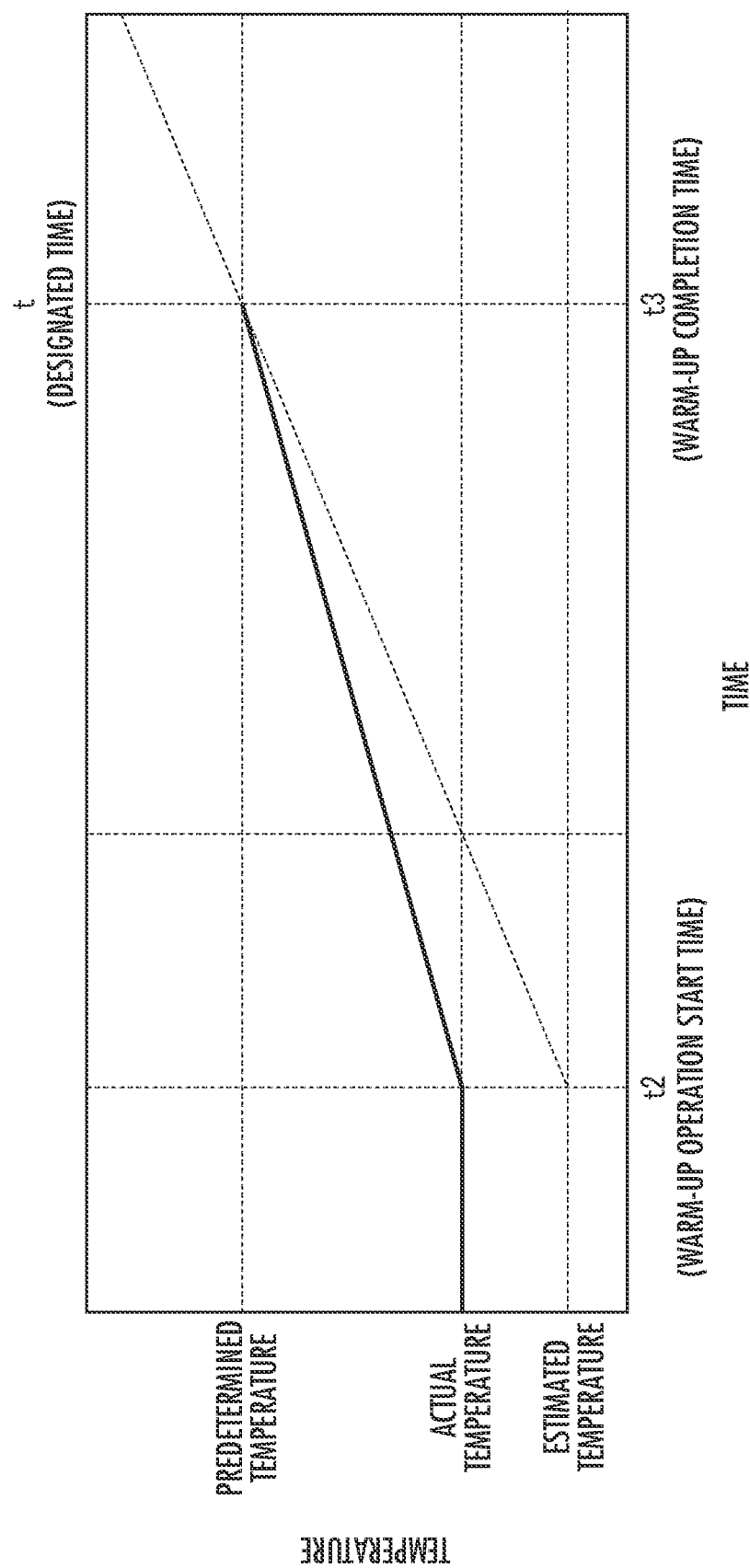
FIG. 8 is a diagram illustrating a change in temperature of the designated component with warm-up of the work machine.

Specifically, the actual machine control device 400 predicts the warm-up completion time t3 when the warm-up operation is completed such that the temperature of the designated component satisfies a designated condition based on the measurement value of the temperature of the designated component and the warm-up capability of the work machine 40, shifts the warm-up start time t2 to a warm-up start time t2' as illustrated in FIG. 7 to delay start of the warm-up operation when the warm-up completion time t3 is earlier than the designated time t, or gently performs the warm-up (suppresses the warm-up capability) as illustrated in FIG. 8 not to cause fuel consumption until the designated time t since the warm-up operation was completed.

It is determined whether or not the measurement value of the internal state variable satisfies the designated condition (FIG. 4/STEP418). Specifically, it is determined whether or not the temperature of an internal coefficient target has increased to a predetermined temperature.

If a result of the determination is negative (FIG. 4/NO in STEP418), processing for the determination is repeated. On the other hand, if the result of the determination is affirmative (FIG. 4/YES in STEP418), a warm-up completion notification is transmitted to the operation support server 10 (FIG. 4/STEP420).

The determination whether or not the measurement value of the internal state variable satisfies the designated condition may be performed depending on the number of engine revolution and/or the frequency of an engine sound of the work machine 40.

Specifically, with the warm-up being insufficient, the number of revolutions and/or the frequency do/does not fall within a predetermined range. However, when the warm-up progresses, the number of revolutions and/or the frequency fall/falls within the predetermined range. Thus, when such a change is captured, the completion of the warm-up can be determined.

If there is nothing corresponding to the internal state recognition unit 460, the warm-up is started at the time point where the warm-up operation command is received, and can determine that the warm-up is completed when the warm-up can be continued until the designated time t.

The second support processing element 122 transmits the warm-up completion notification to the remote operation apparatus 20 (FIG. 4/STEP119) when it receives the warm-up completion notification (FIG. 4/C12).

In the remote operation apparatus 20, if the remote control device 200 receives the warm-up completion notification (FIG. 4/C22), the warm-up completion notification is outputted to the image output device 221 constituting the remote output interface 220 and/or the client 60 (FIG. 4/STEP214). As a result, the warm-up completion notification is outputted immediately before the designated time t, and the operator can recognize that the warm-up of the work machine 40 has been completed.

(Second Function)

A further function of the operation support system having the above-described configuration will be described with reference to a flowchart illustrated in FIG. 5.

Figure 5:
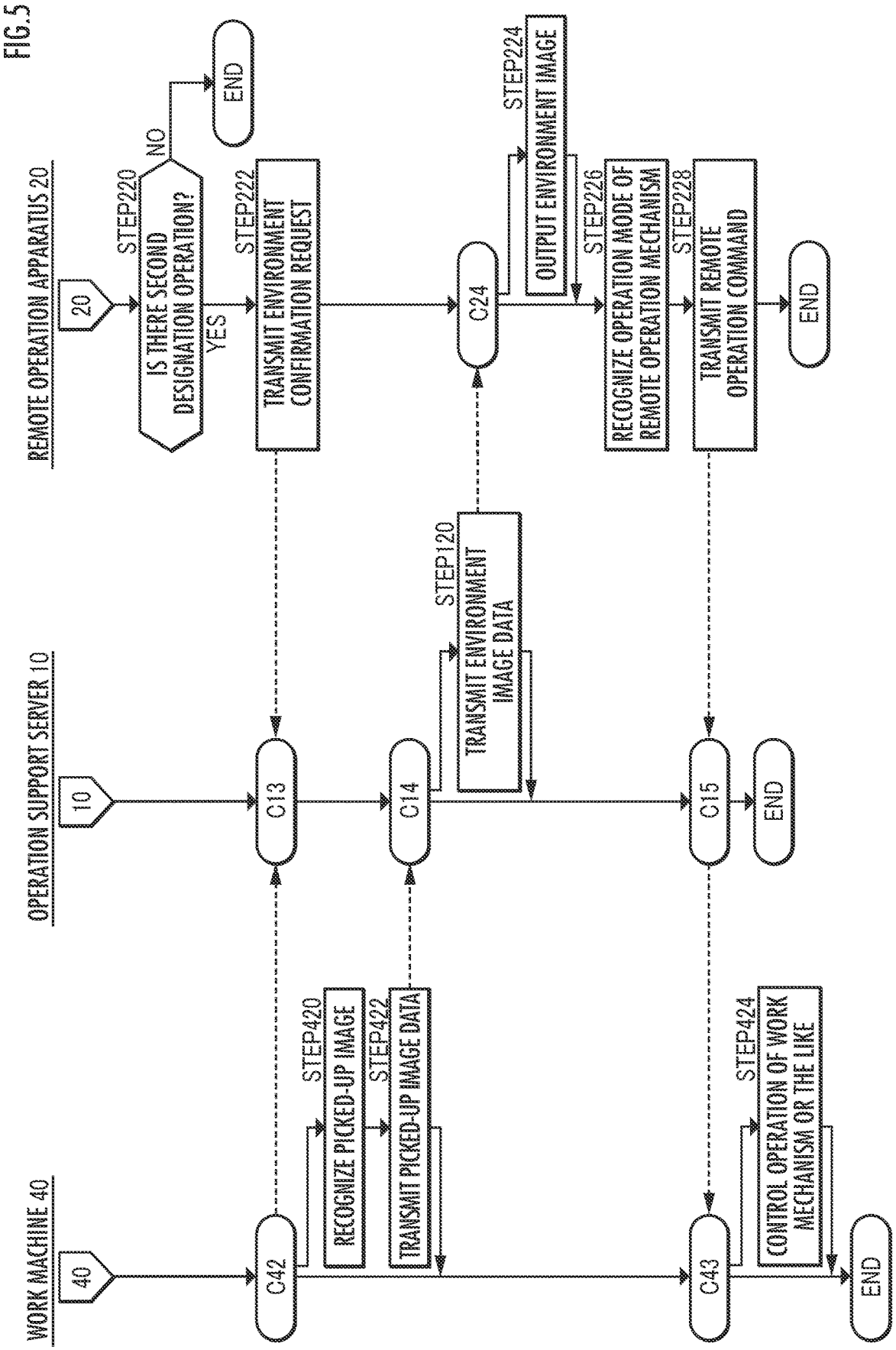
FIG. 5 is an explanatory diagram relating to a function of the operation support system.

In the remote operation apparatus 20, the presence or absence of a second designation operation through the remote input interface 210 by the operator is determined (FIG. 5/STEP 220). An example of the "second designation operation" is an operation such as a tap in the remote input interface 210 configured to designate the work machine 40 remote operation of which is intended by the operator. If a result of the determination is negative (FIG. 5/NO in STEP220), processing subsequent to the determination of the presence or absence of the designation operation is repeated. On the other hand, if the result of the determination is affirmative (FIG. 5/YES in STEP220), an environment confirmation request is transmitted to the operation support server 10 through the remote wireless communication equipment 222 (FIG. 5/STEP222).

In the operation support server 10, if the environment confirmation request is received, the first support processing element 121 transmits the environment confirmation request to the corresponding work machine 40 (FIG. 5/C13).

In the work machine 40, if the environment confirmation request is received through the actual machine wireless communication equipment 422 (FIG. 5/C42), the actual machine control device 400 recognizes a picked-up image through the actual machine image pickup device 412 (FIG. 5/STEP420). The actual machine control device 400 transmits picked-up image data representing the picked-up image to the remote operation apparatus 20 through the actual machine wireless communication equipment 422 (FIG. 5/STEP422).

In the operation support server 10, if the first support processing element 121 receives the picked-up image data (FIG. 5/C14), the second support processing element 122 transmits environment image data corresponding to the picked-up image to the remote operation apparatus 20 (FIG. 5/STEP120). The environment image data is not only the picked-up image data itself but also image data representing a simulated environment image generated based on the picked-up image.

In the remote operation apparatus 20, if the environment image data is received through the remote wireless communication equipment 222 (FIG. 5/C24), the remote control device 200 outputs an environment image corresponding to the environment image data to the image output device 221 (FIG. 5/STEP224).

Figure 9:
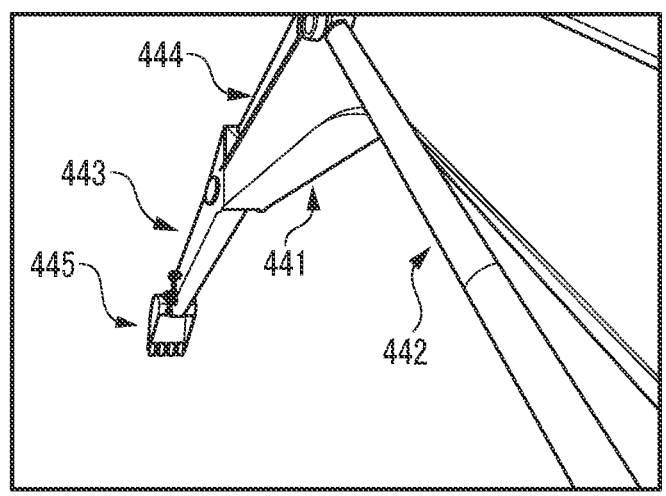
FIG. 9 is an explanatory diagram relating to a work environment image.

As a result, an environment image on which a boom 441, an arm 443, and a bucket 445, respectively, as parts of the work attachment 440 are reflected is outputted to the image output device 221, as illustrated in FIG. 9, for example.

In the remote operation apparatus 20, the remote control device 200 recognizes an operation mode of the remote operation mechanism 211 (FIG. 5/STEP226), and transmits a remote operation command corresponding to the operation mode to the operation support server 10 through the remote wireless communication equipment 222 (FIG. 5/STEP228).

In the operation support server 10, if the second support processing element 122 receives the remote operation command, the first support processing element 121 transmits the remote operation command to the work machine 40 (FIG. 5/C15).

In the work machine 40, if the actual machine control device 400 receives the operation command through the actual machine wireless communication equipment 422 (FIG. 5/C43), an operation of the work attachment 440 or the like is controlled (FIG. 5/STEP424). As a result, the remote operation of the work machine 40 is started at the time t3 or later, as illustrated in FIG. 6. In this case, the warm-up operation is completed. For example, work for scooping soil in front of the work machine 40 using the bucket 445 and dropping the soil from the bucket 445 after turning the upper turning body 420 is performed.

(Effect)

According to the operation support server 10 having the configuration, a predicted value of a temperature (internal state variable) of a designated component in the work machine 40 at a designated time t is recognized based on a time series of predicted values of an outside air temperature (external state variable) around the work machine 40 over a period until the designated time t.

A warm-up operation of the work machine 40 is started at a time before the designated time t based on communication with the work machine 40 such that the predicted value of the temperature of the designated component in the work machine 40 at the designated time t satisfies a designated condition (see FIG. 4/YES in STEP113→STEP116→ ... → STEP416). Accordingly, the operator can start work at the designated time t or a time close thereto using the work machine 40 in which the temperature of the designated component satisfies the designated condition.

The first support processing element 121 recognizes a warm-up capability when the work machine 40 performs the warm-up operation, and the second support processing element 122 predicts a warm-up completion time t3 when the predicted value of the internal state variable satisfies the designated condition based on the warm-up capability of the work machine 40 recognized by the first support processing element 121 and performs processing for causing the work machine 40 to start the warm-up operation based on communication with the work machine 40 in order to make a warm-up completion time t3 match the designated time t.

The warm-up completion time t3 is predicted in view of the warm-up capability of the work machine 40. Processing for causing the work machine 40 to start the warm-up operation is performed in order to make the warm-up completion time t3 match or come close to the designated time t. However, the warm-up completion time t3 is not completely the same as the designated time t, and may be a time slightly before the designated time t. A warm-up operation period elapsed until a value of the temperature (internal state variable) of the designated component satisfies the designated condition is shortened by an amount in which a time interval between the warm-up completion time t3 and the designated time t has been shortened, and thus energy consumption (or fuel consumption) required for the warm-up operation is reduced by the amount of the shortening.

The second support processing element 122 outputs a warm-up delay notification to either one of the respective output interfaces 220 and 620 in the remote operation apparatus 20 and the client 60 based on communication with the remote operation apparatus 20 or the client 60 when the warm-up completion time t3 to be predicted when the warm-up operation of the work machine 40 is started at a current time is later than the designated time.

Even if the warm-up operation of the work machine is started at the current time, when the warm-up completion time is later than the designated time, the warm-up delay notification is outputted to either one of the respective remote output interfaces 220 and 620 in the remote operation apparatus 20 and the client 60 (see FIG. 4/NO in STEP113→STEP114→STEP213). As a result, even if the warm-up operation of the work machine 40 is started immediately from the current time, a notification that the warm-up completion time t3 when the predicted value of the temperature (internal state variable) of the designated component satisfies the designated condition is inevitably delayed can be transmitted to the operator or the like.

The temperature (internal state variable) of the designated component is measured in the work machine, the warm-up completion time t3 is predicted based on the measurement value, and the work machine 40 starts the warm-up operation in order to make the warm-up completion time t3 match the designated time t (see FIG. 4/STEP414→STEP416). The warm-up operation period elapsed until the value of the internal state variable satisfies the designated condition is shortened by an amount in which the time interval between the warm-up completion time t3 and the designated time t is shortened with high accuracy, and thus energy consumption (or fuel consumption) required for the warm-up operation is reduced by the amount of the shortening.

(Another Embodiment of Present Invention)

In the present embodiment, when the current time reaches the warm-up operation start time t2, the second support processing element 122 transmits the warm-up operation command to the work machine 40 (see FIG. 4/STEP116). However, in another embodiment, a second support processing element 122 may transmit a warm-up operation command including a warm-up start time t2 to a work machine 40. In this case, in the work machine 40, if the warm-up operation command is received (FIG. 4/C41), an actual machine control device 400 starts a warm-up operation at the warm-up operation start time t2 (FIG. 4/STEP416). At a time point where the warm-up operation command is received, the actual machine control device 400 predicts a warm-up completion time t3 based on a measurement value of a temperature of a designated component in the work machine 40 and a warm-up capability of the work machine 40. If the warm-up completion time t3 is earlier than a designated time t, a warm-up operation is performed by delaying start of the warm-up operation or reducing the warm-up capability. A warm-up operation period elapsed until a value of a temperature (internal state variable) of the designated component satisfies a designated condition is shortened by an amount in which a time interval between the warm-up completion time t3 and a designated time t has been shortened, and thus energy consumption (or fuel consumption) required for the warm-up operation is reduced by the amount of the shortening.

REFERENCE SIGNS LIST

10 . . . operation support server, 20 . . . remote operation apparatus, 40 . . . work machine, 41 . . . actual machine input interface, 42 . . . actual machine output interface, 102 . . . database, 121 . . . first support processing element, 122 . . . second support processing element, 200 . . . remote control device, 210 . . . remote input interface, 211 . . . remote operation mechanism, 220 . . . remote output interface, 221 . . . image output device, 400 . . . actual machine control device, 424 . . . cab (operation room), 440 . . . work attachment (actuation mechanism), 445 . . . bucket (work portion).

The invention claimed is:

1. An operation support server comprising:
a first support processing element including a processor and a storage device, the first support processing element being configured to recognize a time series of predicted values of an external state variable representing an environment of a work machine over a period from a current time to a designated time as a scheduled work start time by the work machine based on communication with an external information source; and
a second support processing element including a processor and a storage device, the second support processing element being configured to recognize a predicted value at the designated time of an internal state variable representing a state of a component in the work machine to be affected by a warm-up operation mode of the work machine based on a rate change of an outside air temperature per unit time obtained from the time series of the predicted values of the external state variable recognized by the first support processing element and perform processing for causing the work machine to start a warm-up operation at a time before the designated time based on communication with the work machine such that the predicted value of the internal state variable at the designated time satisfies a designated condition.

2. The operation support server according to claim 1, wherein
the first support processing element recognizes a warm-up capability when the work machine performs the warm-up operation, and
the second support processing element predicts a warm-up completion time when the predicted value of the internal state variable satisfies the designated condition based on the warm-up capability of the work machine recognized by the first support processing element and performs processing for causing the work machine to start the warm-up operation based on communication with the work machine to make the warm-up completion time match the designated time.

3. The operation support server according to claim 1, wherein the second support processing element is configured to recognize the predicted value at the designated time of the internal state variable representing the state of the component in the work machine to be affected by the warm-up operation mode of the work machine based on a temperature difference between the outside air temperature and a temperature of the component of the work machine in a case where the rate of change exceeding a threshold value is observed.

4. An operation support system comprising the operation support server according to claim 2 and a work machine, wherein
the work machine comprises an actual machine control device and an internal state recognition unit, and
the actual machine control device predicts the warm-up completion time based on a measurement value of the internal state variable acquired by the internal state recognition unit, and starts the warm-up operation of the work machine to make the predicted warm-up completion time match the designated time.

5. An operation support method comprising:
first support processing for recognizing a time series of predicted values of an external state variable representing an environment of the work machine over a period from a current time to a designated time as a scheduled work start time by the work machine based on communication with an external information source; and
second support processing for recognizing a predicted value at the designated time of an internal state variable representing a state of a component in the work machine to be affected by a warm-up operation mode of the work machine based on a rate change of an outside air temperature per unit time obtained from the time series of the predicted values of the external state variable recognized by performing the first support processing and performing processing for causing the work machine to start a warm-up operation at a time before the designated time based on communication with the work machine such that the predicted value of the internal state variable at the designated time satisfies a designated condition.

6. The operation support method according to claim 5, wherein the second support processing is configured to recognize the predicted value at the designated time of the internal state variable representing the state of the component in the work machine to be affected by the warm-up operation mode of the work machine based on a temperature difference between the outside air temperature and a temperature of the component of the work machine in a case where the rate of change exceeding a threshold value is observed.

7. The operation support server according to claim 3, wherein
the second support processing element outputs a warm-up delay notification to an output interface of a client based on communication with the client when the warm-up completion time predicted when the warm-up operation of the work machine is started at a current time is later than the designated time.

* * * * *